United States Patent [19]

Petrusek

[11] E Re. 28,480

[45] Reissued July 15, 1975

[54] INFLATABLE BOXING GLOVE OR PILLOW

[76] Inventor: Victor Petrusek, 18511 Gottschalk St., Homewood, Ill. 60430

[22] Filed: Oct. 4, 1974

[21] Appl. No.: 511,984

Related U.S. Patent Documents

Reissue of:

[64] Patent No.: 3,755,820
Issued: Sept. 4, 1973
Appl. No.: 318,231
Filed: Dec. 26, 1972

U.S. Applications:

[63] Continuation-in-part of Ser. No. 229,009, Feb. 24, 1972, abandoned, which is a continuation-in-part of Ser. No. 159,774, July 6, 1971, abandoned.

[52] U.S. Cl. ..... 2/18
[51] Int. Cl. ..... A41d 13/08
[58] Field of Search ..... 2/16, 18, 158; 5/337

[56] References Cited

UNITED STATES PATENTS

| | | | |
|---|---|---|---|
| 972,224 | 10/1910 | Pease | 2/18 |
| 1,050,648 | 8/1915 | Travers | 2/18 |
| 1,053,204 | 2/1913 | Morrison | 2/18 X |
| 1,826,221 | 10/1931 | Pearson | 273/58 B |
| 2,130,200 | 9/1938 | Smith | 2/18 |
| 2,653,319 | 9/1953 | Slizus | 2/18 |
| 2,705,148 | 3/1955 | Waller | 273/58 BX |
| 2,817,088 | 12/1957 | Vrana | 2/18 |
| 2,826,757 | 3/1958 | Vrana | 2/18 |
| 2,881,445 | 4/1959 | Vrana | 2/18 |
| 2,881,446 | 4/1959 | Vrana | 2/18 |
| 3,247,520 | 4/1966 | Slizus | 2/18 |
| 3,332,415 | 7/1967 | Ericson | 5/337 X |

FOREIGN PATENTS OR APPLICATIONS

| | | | |
|---|---|---|---|
| 739,377 | 10/1932 | France | 2/18 |

*Primary Examiner*—Alfred R. Guest
*Attorney, Agent, or Firm*—Sabin C. Bronson

[57] ABSTRACT

An air inflated boxing glove or pillow. The glove includes a casing having an axially disposed open ended tubular sleeve. The sleeve is encompassed by an annular cylindrical band to which bell shaped end shell sections are fixed along the opposite edges. The bell shaped sections are provided with axial openings in which the ends of the sleeve are fixed. An air valve is provided in the casing.

A modified form of the boxing glove has a partition at one end of the cylindrical band to which one bell shaped end shell section is fixed about the periphery thereof. An opening is provided through the partition so that air may inflate the end shell section.

A further modified form of the boxing glove eliminates one bell section, and a circular partition is provided in the tubular sleeve.

12 Claims, 9 Drawing Figures

INVENTOR
VICTOR PETRUSEK

BY Sabin C. Bronson
ATT'Y.

INFLATABLE BOXING GLOVE OR PILLOW

Matter enclosed in heavy brackets [ ] appears in the original patent but forms no part of this reissue specification; matter printed in italics indicates the additions made by reissue.

---

This application is a continuation-in-part of my application Ser. No. 229,009 filed Feb. 24, 1972, now abandoned, which in turn is a continuation-in-part of my application Ser. No. 159,774, filed July 6, 1971, now abandoned.

BACKGROUND-SUMMARY-DRAWINGS

The present invention relates to boxing pillows and more particularly to a lightweight boxing pillow capable of being used by a child.

Boxing pillows of the type that are inflatable to provide the cushioning media are of lighter weight structure than the conventional padded structure. This lighter weight makes it possible for children of all ages to use the pillow. At the same time the air inflated structure provides a yieldable shock absorbing media which is capable of protecting the hands of the wearer and also prevents the user from striking damaging blows on an opponent.

Moreover, the air inflatable pillows of the foregoing type are capable of accommodating a wide range of fist sizes so that it is capable of being used a number of years by a growing child. Another feature of the air inflated pillow resides in the absence of laces or the like to retain the glove secured on the user's hand.

By the present invention it is proposed to provide an improved air inflated glove or pillow of the foregoing type.

The glove or pillow is made from a flexible material and comprises generally an open ended tubular sleeve that provides a fist receiving pocket, a bell shaped end attached at each of the ends of the sleeve and a central annular band joining the inner ends of the bells to provide, with the end bells, an outer sheath or casing, forming air receiving chambers completely encompassing the sleeve between the open ends thereof. An air valve is provided in the sheath through which air is charged into the chamber.

DESCRIPTION OF THE PREFERRED EMBODIMENT

Figure 1:
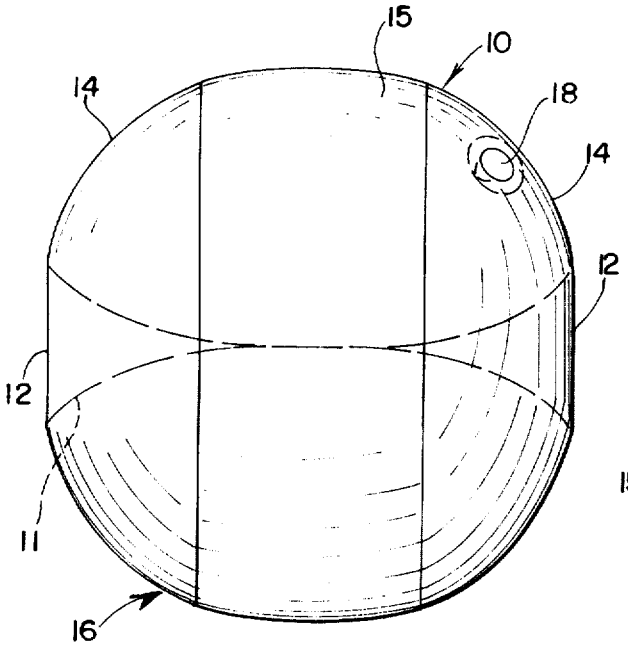
FIG. 1 is a side elevational view of a glove embodying the structure of the present invention.
Figure 2:
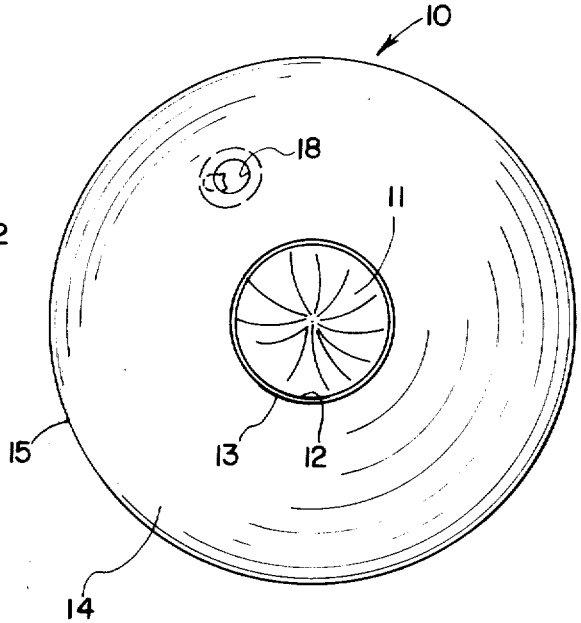
FIG. 2 is an elevational view of the glove.
Figure 3:
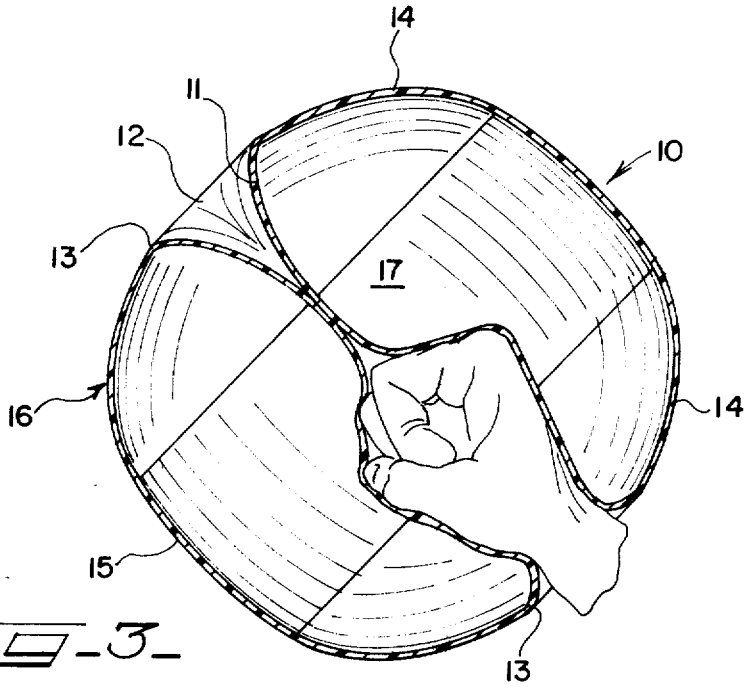
FIG. 3 is a lengthwise cross-sectional view of the glove shown on the fist of the user.

Referring now to the drawings there is shown a boxing glove or pillow 10 embodying the structure of the present invention. The glove 10 is made from air impervious flexible and resilient sheet material such as plastic, rubber or the like and includes a tubular sleeve having open ends 12. Fixed to the sleeve ends in axial openings 13 are generally bell shaped end shells 14. The end shells may be fastened to the sleeve 11 as by means of heat sealing or a suitable adhesive.

Also fixed to the inner ends of the bell shaped end shells 14 is an annular band 15. The annular band 15 lies substantially midway between the ends of the glove so as to form a substantially symetrical sheath or casing 16 about the longitudinal center line as well as about the transverse center line of the glove 10. The sheath 16 defines an air chamber 17 encompassing the sleeve 11.

An air valve 18 of substantially conventional structure is suitable for charging and discharging air from the air chamber *77* [ 177 ] fixed to the sheath 16. In the embodiment shown the air valve 18 is fixed in one of the end shells 14. To eliminate or minimize damage, the air valve 18 may be of the type which lies substantially flush with the sheath 16.

In use a deflated glove 10 is generally applied on the clenched fist of the user. In the deflated condition the fist is easily inserted in one of the open ends 12 due to the resiliency of the material from which the glove components are made. Thereafter the glove 10 is inflated by charging the chamber 17 with air under pressure. The inflation of the bag causes the end bell sections to be expanded outwardly and the center portion of the sleeve 11 to normally constrict because of the tension forces created by the expanding end bells and the air pressure, while the outer end sections are open to their maximum width as shown in the Figures. When the fist is inserted in one of the openings the inflation results in constricting the sleeve 11 as described above, it is obvious that the section of the sleeve 11 about the fist tightly grips the latter and prevents the clenched fist from being withdrawn. At the same time the portion of the sleeve on the opposite end of the fist is closed off so that the knuckles of the hand are protected and further inward movement of the fist through the sleeve is prevented.

Thus the glove 10 is securely fastened on the clenched fist by the air pressure and the resiliency of the glove material.

To remove the glove from the fist, the hand is straightened which lessens the surface contact of the sleeve therewith so that the hand may be easily withdrawn from the sleeve, or the glove may be deflated for more convenient removal of the hand.

This is accomplished by evacuating the air through the air valve. As the glove deflates the end shells collapse at the ends and reduce the lengthwise tension on the sleeve 11. This permits the sleeve 11 to form a sleeve of substantially uniform cross-section along its length. In this condition the fist may easily be withdrawn from the glove sleeve.

Figure 4:
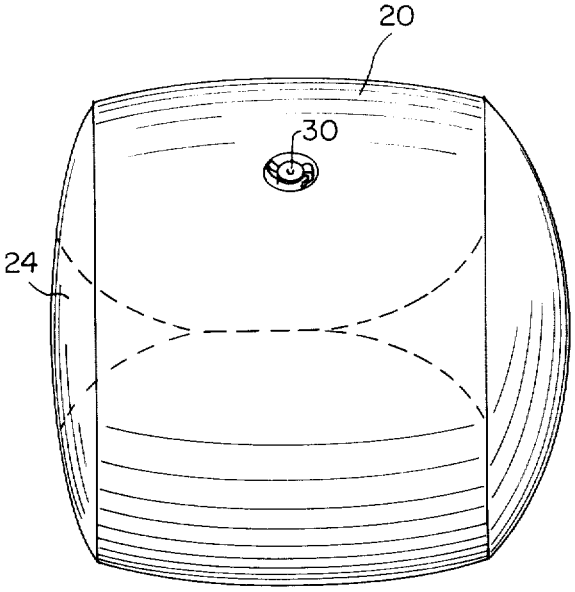
FIG. 4 is a side elevational view of a glove embodying a modified form of structure of the invention.
Figure 5:
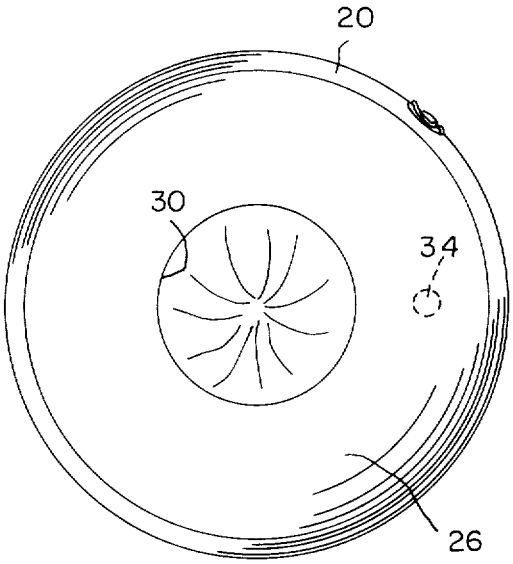
FIG. 5 is an end elevational view of FIG. 4.
Figure 6:
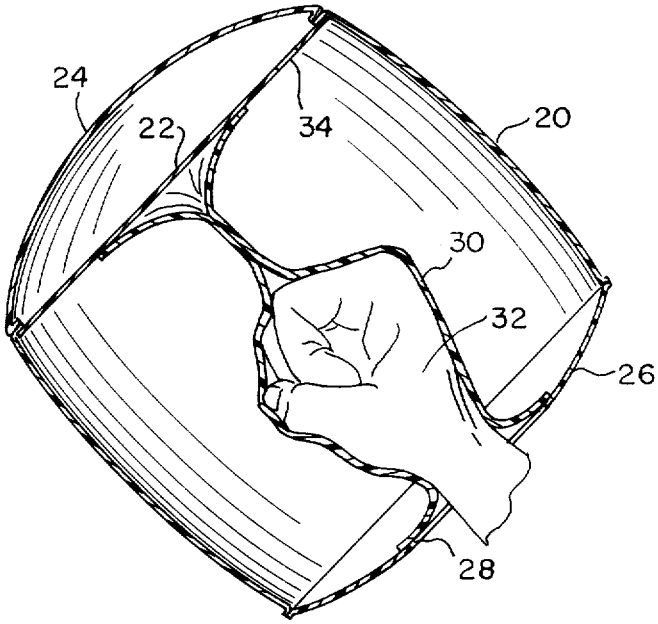
FIG. 6 is a lengthwise cross-sectional view of FIG. 4 shown on the fist of a user.

Now referring to the modification of the invention shown in FIGS. 4, 5 and 6. In this modification the glove is formed of a central cylindrical portion 20; a circular partition 22 secured at its rim to and closing the outer end of portion 20, an end segment 24 secured at its edge to the rim of the partition 22; an inner end portion 26 secured at its rim to the inner end of cylindrical portion 20. End portion 26 has an axial opening 28 therein, to the edge of which is secured one end of a collapsible sleeve 30. Said sleeve extends axially within the cylindrical portion 20 to the partition 22, to which the other end of said sleeve 30 is secured.

Section 20 has an air valve 30 therein by which an air chamber, defined by the cylindrical portion and end portions, may be inflated or deflated.

As in the former modification, when the glove is deflated, the fist 32 of a boxer may be inserted within the sleeve, the glove inflated until the sleeve 30 is constricted tightly about the fist of the boxer so that in ordinary use it will not permit the boxer's fist to extend further into the sleeve.

So that the outer segment of the glove may also be inflated, the partition 22 is provided with an opening 34 whereby the air under pressure may also inflate the end area of the glove.

In this modification the inflation and deflation of the glove is accomplished as above described.

In the former modification it was found that sometimes in a hurry to apply the glove to the fists of the boxer the glove was not inflated enough to secure the same tightly about the boxer's fist and in such underinflated condition it might be possible for the boxer's fist to slide through the sleeve and directly strike the body of his opponent. When properly inflated however, this would not happen. With the modification shown in FIGS. 4–6 this cannot happen.

Figure 7:
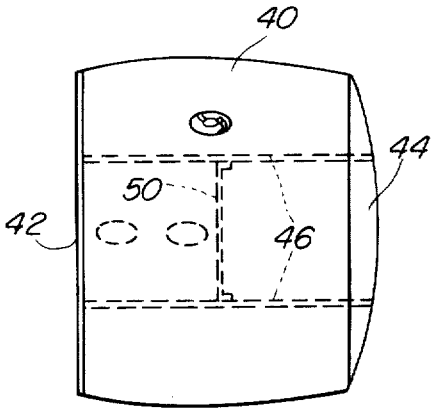
FIG. 7 is a side elevational view of a glove embodying a further modified form of structure of the invention.
Figure 8:
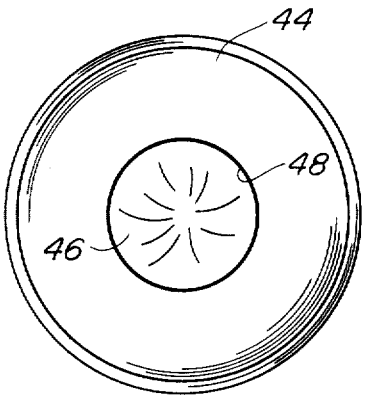
FIG. 8 is an end elevational view of FIG. 7.
Figure 9:
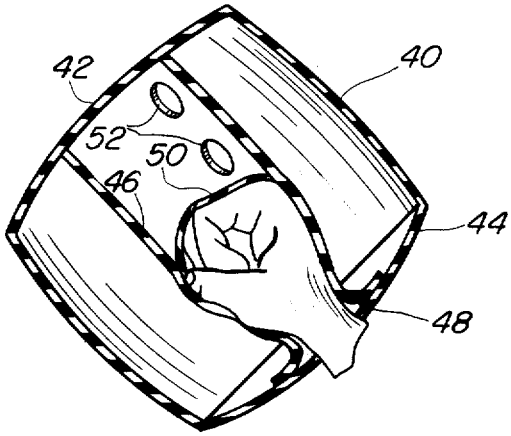
FIG. 9 is a longitudinal cross-sectional view of FIG. 7 shown with a fist of the user inserted in the sleeve.

In the modification of the invention shown in FIGS. 7, 8 and 9 a difference in structure is shown, in that the end segment of the glove as shown at 24 in FIG. 6 and at 14 in FIG. 1 is eliminated. Otherwise, the structure is substantially the same, being composed of a central cylindrical portion 40, a circular end partition 42 secured at its rim and closing the outer end of the cylindrical portion 40; an inner end portion 44 secured at its rim to the inner end of cylindrical portion 40. Extending axially between the circular end portions 42 and 44 is a sleeve 46 secured at its outer end to end portion 42 and at its inner end to and about the margin of an annular axial opening 48 in end portion 44. This opening as in the other modifications permits entry of a boxer's fist in applying the glove thereto.

A circular partition 50 is installed across the sleeve 46 about midway of its ends to limit the extent the fist can extend therethrough. That portion of the sleeve between the partition 50 and the end portion 42 is provided with air openings 52 so that when the cylindrical portion 40 is inflated it will similarly inflate the area of the sleeve 46 between the partition 50 and the end portion 42 so that the whole area of the glove except that occupied by the fist is inflated and forms a cushion to soften the blows of a boxer.

The above description, taken in connection with the accompanying drawings, is believed to be amply sufficient to be understood by those versed in the art so that they can make and use the invention.

I claim:

1. A boxing glove made from resilient air impervious sheet material comprising an axially disposed open ended tubular sleeve, a spherical casing encompassing said sleeve defining an air chamber about said sleeve, and means attaching said casing to said sleeve so that at least one end of said sleeve remains open to permit insertion of a fist into said sleeve, a partition extending over and closing the other end of said sleeve, and means securing said partition to said casing to divide said casing into two air chambers, one of said air chambers comprising a segmentally shaped end air chamber, and an air inlet valve in said casing for inflating said chambers with air whereby upon inflation said tubular sleeve is collapsed to firmly embrace and restrict movement of a user's fist inserted in said sleeve.

2. The invention as defined in claim 1 wherein said casing includes a segmentally shaped end section having an opening, said sleeve attaching means securing said open end of said sleeve to the edge of said opening in said segmentally shaped end section.

3. The invention as defined in claim 1 wherein air communication means is provided between said air chambers.

4. The invention as defined in claim 2 wherein said casing includes a second segmentally shaped end section, and an annular band, and wherein said segmentally shaped end sections are symmetrically disposed about said sleeve.

5. The invention as defined in claim 1 wherein said partition includes a rim, said partition securing means securing said partition about its rim to said casing.

6. A boxing glove made from resilient air impervious sheet material comprising an axially disposed open ended tubular sleeve, a spherical casing encompassing said sleeve defining an air chamber about said sleeve, means attaching said casing to said sleeve so that at least one end of said sleeve remains open to permit insertion of a fist into said sleeve, a partition, means securing said partition to said sleeve, said partition spaced from said one open end of said sleeve and from the portion of the casing in alignment with said sleeve to divide said casing into two air chambers, one of said air chambers encompassing said sleeve with the other air chamber located opposite said partition, and means in said casing for inflating said chambers with air.

7. The invention as defined in claim 6 wherein means are provided for air communication between said air chambers.

8. The invention as defined in claim 6 wherein said partition closes said sleeve and prevents penetration of a fist in said sleeve beyond said partition.

9. The invention as defined in claim 6 including means attaching said casing to the other end of said sleeve, and wherein said partition is secured to said sleeve intermediate the ends thereof.

10. The invention as defined in claim 6 wherein said sleeve is maintained axially within said casing by said means which attaches said casing to said sleeve.

11. A boxing glove made from resilient sheet material comprising an axially disposed open ended tubular sleeve, a spherical casing encompassing said sleeve defining an air chamber about said sleeve and being attached to said sleeve so that at least one end thereof remains open to permit insertion of a fist into said sleeve, an air valve in said casing for inflating said chamber with air, and said sleeve including constriction means for collapsing said tubular sleeve upon inflation of said chamber to form a constriction to firmly embrace and restrict movement of the user's fist inserted in said sleeve.

12. A boxing glove made from resilient air impervious sheet material comprising an axially disposed open ended tubular sleeve, a spherical casing encompassing said sleeve defining an air chamber about said sleeve, and means attaching said casing to said sleeve so that at least one end of said sleeve remains open to permit insertion of a fist into said sleeve, a partition extending over and closing the other end of said sleeve, and means securing said partition to said casing to divide said casing into two air chambers, one of said air chambers comprising a segmentally shaped end air chamber, and an air inlet valve in said casing for inflating said chambers with air.

* * * * *

UNITED STATES PATENT OFFICE

CERTIFICATE OF CORRECTION

Patent No. RE. 28,480 Dated July 15, 1975

Inventor(s) Victor Petrusek

It is certified that error appears in the above-identified patent and that said Letters Patent are hereby corrected as shown below:

Claims 11 and 12 should appear in italicized type.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*